(12) United States Patent
Routledge

(10) Patent No.: US 11,909,316 B2
(45) Date of Patent: Feb. 20, 2024

(54) IN-RUSH CURRENT PROTECTED POWER CONVERTER

(71) Applicant: pSemi Corporation, San Diego, CA (US)

(72) Inventor: Antony Christopher Routledge, Oakley (GB)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 17/968,440

(22) Filed: Oct. 18, 2022

(65) Prior Publication Data

US 2023/0120452 A1 Apr. 20, 2023

Related U.S. Application Data

(62) Division of application No. 16/783,800, filed on Feb. 6, 2020, now Pat. No. 11,482,931.

(51) Int. Cl.
*H02M 3/158* (2006.01)
*H02M 1/32* (2007.01)
*H02H 7/12* (2006.01)

(52) U.S. Cl.
CPC ............. *H02M 3/158* (2013.01); *H02M 1/32* (2013.01); *H02H 7/1213* (2013.01)

(58) Field of Classification Search
CPC ....... H02M 1/32; H02M 3/158; H02H 7/1213
See application file for complete search history.

(56) References Cited

U.S. PATENT DOCUMENTS

| 6,812,776 | B2 | 11/2004 | Henry |
| 7,663,960 | B2 | 2/2010 | Suzuki et al. |

(Continued)

FOREIGN PATENT DOCUMENTS

CN 102801326 12/2014

OTHER PUBLICATIONS

Kim, Jung H., Notice of Allowance received from the USPTO dated Mar. 10, 2021 for U.S. Appl. No. 16/807,753, 7 pgs.

(Continued)

*Primary Examiner* — Jue Zhang
(74) *Attorney, Agent, or Firm* — JAQUEZ LAND GREENHAUS & McFARLAND LLP; John Land, Esq.

(57) ABSTRACT

Circuits and methods for protecting the switches of charge pump-based power converters from damage if a $V_{OUT}$ short circuit event occurs and/or if $V_{IN}$ falls rapidly with respect to $V_X$ or $V_{OUT}$. A general embodiment includes a $V_X$ Detection Block coupled to the core block of a power converter. The $V_X$ Detection Block is coupled to $V_X$ and to a control circuit that disables operations of an associated converter circuit upon detection of large, rapid falls in $V_X$ during the dead time between clock phase signals, thereby prevent damaging current spikes. Some embodiments include a $V_{IN}$ Detection Block configured to detect and prevent excessive in-rush current due to rapidly falling values of $V_{IN}$ to the power converter. The $V_{IN}$ Detection Block is coupled to $V_{IN}$, and to $V_X$ or $V_{OUT}$ in some embodiments, and to a control circuit to that disables operation of an associated converter circuit.

9 Claims, 8 Drawing Sheets

(56) References Cited

U.S. PATENT DOCUMENTS

| | | |
|---|---|---|
| 8,120,411 B1 | 2/2012 | Liu et al. |
| 8,462,578 B2 | 6/2013 | Neto |
| 9,385,600 B2 | 7/2016 | Torres |
| 9,473,073 B2 | 10/2016 | Liu et al. |
| 9,634,560 B2 | 4/2017 | Ek |
| 9,913,346 B1 | 3/2018 | Xiong |
| 10,263,514 B1 | 4/2019 | Aboueldahab |
| 10,992,226 B1 | 4/2021 | Aboueldahab et al. |
| 11,482,931 B2 | 10/2022 | Routledge |
| 2009/0072800 A1 | 3/2009 | Ramadass et al. |
| 2011/0080761 A1 | 4/2011 | Kung |
| 2011/0279101 A1* | 11/2011 | Sasaki ............... H02M 1/32 323/271 |
| 2013/0234785 A1 | 9/2013 | Dai et al. |
| 2015/0241891 A1* | 8/2015 | Lee ............... H05B 47/20 315/127 |
| 2016/0116925 A1 | 4/2016 | Freeman et al. |
| 2016/0234895 A1 | 8/2016 | Delos Ayllon et al. |
| 2016/0294286 A1 | 10/2016 | Cui |
| 2017/0288553 A1 | 10/2017 | Fahlenkamp |
| 2017/0353107 A1 | 12/2017 | Shao |
| 2018/0097444 A1 | 4/2018 | Aichen et al. |
| 2019/0296630 A1 | 9/2019 | Aichen et al. |
| 2021/0249955 A1 | 8/2021 | Routledge |
| 2021/0359590 A1 | 11/2021 | Low |

OTHER PUBLICATIONS

Van Der Meer, Paul, International Search Report and Written Opinion received from the EPO dated Jun. 10, 2021 for appln. No. PCT/US2021/020468, 12 pgs.

Weinstein, et al., "Plug-and-Play Digital Controllers for Scalable Low-Power SMPS", IEEE 2008, University of Toronto, 6 pgs.

Cornea, et al., "Interleaved 3 Phase DC/DC Converter for Automotive Applications", 2010, 12th International Conference on Optimization of Electrical and Electronic Equipment, OPTIM 2010, 6 pgs.

Nguyen, Matthew Van, Office Action received from the USPTO dated Oct. 7, 2021 for U.S. Appl. No. 16/783,800, 5 pgs.

Nguyen, Matthew Van, Office Action received from the USPTO dated Mar. 10, 2022 for U.S. Appl. No. 16/783,800, 21 pgs.

Nguyen, Matthew Van, Notice of Allowance received from the USPTO dated Jun. 15, 2022 for U.S. Appl. No. 16/783,800, 10 pgs.

Kim, Jung H., Office Action received from the USPTO dated Nov. 18, 2020 for U.S. Appl. No. 16/807,753, 15 pgs.

Van Der Meer, Paul, International Preliminary Report on Patentability received from the EPO dated Jun. 9, 2022 for appln. No. PCT/US2021/020468, 34 pgs.

* cited by examiner

IN-RUSH CURRENT PROTECTED POWER CONVERTER

CROSS-REFERENCE TO RELATED APPLICATION

The present divisional application claims priority to the following patent application, assigned to the assignee of the present invention, the contents of which are incorporated by reference: U.S. patent application Ser. No. 16/783,800, filed Feb. 6, 2020, entitled "In-Rush Current Protected Power Converter".

BACKGROUND

(1) Technical Field

This invention relates to electronic circuits, and more particularly to power converter circuits.

(2) Background

Many electronic products, particularly mobile computing and/or communication products and components (e.g., notebook computers, ultra-book computers, tablet devices, LCD and LED displays) require multiple voltage levels. For example, radio frequency transmitter power amplifiers may require relatively high voltages (e.g., 12V or more), whereas logic circuitry may require a low voltage level (e.g., 1-2V). Still other circuitry may require an intermediate voltage level (e.g., 5-10V).

Power converters are often used to generate a lower or higher voltage from a common power source, such as a battery. Power converters which generate a lower output voltage (e.g., $V_{OUT}$) level from a higher input voltage (e.g., $V_{IN}$) power source are commonly known as step-down or buck converters, so-called because $V_{OUT} < V_{IN}$, and hence the converter is "bucking" the input voltage. Power converters which generate a higher output voltage level from a lower input voltage power source are commonly known as step-up or boost converters, because $V_{OUT} > V_{IN}$. In many embodiments, a power converter may be bi-directional, being either a step-up or a step-down converter depending on how a power source is connected to the converter.

Direct current (DC) power is becoming more important as portable devices, solar energy, electric vehicles, and DC power distribution become widespread. A major issue with DC power has been difficulty in efficiently changing voltage levels, unlike the ease with which AC power can be converted using highly efficient transformers. In recent years, DC-to-DC power converters have become available with around 90% efficiency. However, efforts have been made to develop even higher efficiency DC-to-DC power converters.

For example, FIG. 1 is a block diagram showing a prior art adiabatic DC-to-DC power converter 100. An adiabatic DC-to-DC power converter generally means a converter design that stores charge and reuses that charge to improve efficiency. In the illustrated example, the power converter 100 includes a core block 101 that includes a converter circuit 102 and a controller 104. The converter circuit 102 is configured to receive an input voltage $V_{IN}$ from a voltage source 106 across terminals V1+, V1−, and transform the input voltage $V_{IN}$ into an output voltage $V_{OUT}$ across terminals V2+, V2−. The output voltage $V_{OUT}$ is generally coupled across an output capacitor $C_{OUT}$, across which may be connected a load 108.

The controller 104 receives a set of input signals and produces a set of output signals. Some of these input signals arrive along a signal path 110 connected to the converter circuit 102. These input signals carry information that is indicative of the operational state of the converter circuit 102. The controller 104 also receives at least a clock signal CLK and one or more external input/output signals I/O that may be analog, digital, or a combination of both. Based upon the received input signals, the controller 104 produces a set of control signals back to the converter circuit 102 on the signal path 110 that control the internal components of the converter circuit 102 (e.g., internal switches, such as low voltage FETs, especially MOSFETs) to cause the converter circuit 102 to boost or buck $V_{IN}$ to $V_{OUT}$. In some embodiments, an auxiliary circuit (not shown) may provide various signals to the controller 104 (and optionally directly to the converter circuit 102), such as the clock signal CLK, the input/output signals I/O, as well as various voltages, such as a general supply voltage $V_{DD}$ and a transistor bias voltage $V_{BIAS}$. In the illustrated example, the controller 104 provides non-overlapping clock signals P1 and P2 to the converter circuit 102 on separate lines; however, it should be appreciated that the clock signals P1, P2 could be provided over the signal path 110.

In the illustrated example, a $V_X$ node at the output of the converter circuit 102 is coupled through an adiabatic inductor L to the output capacitor $C_{OUT}$. The adiabatic inductor L improves the efficiency of the power converter 100 by storing energy during certain periods of a charging cycle and reusing that energy during other periods of the charging cycle. An intermediate capacitor $C_{VX}$ is generally coupled across the output terminals V2+, V2− of the converter circuit 102 before the adiabatic inductor L to control the voltage at the $V_X$ node. The capacitance of the intermediate capacitor $C_{VX}$ generally would be set to be much smaller than the capacitance of the output capacitor $C_{OUT}$ (e.g., 50 to 100 times smaller) and smaller than the capacitance of charge pump capacitors within the converter circuit 102 (e.g., 5 to 10 times smaller). As should be clear, the immediate output of the core block 101 is the $V_X$ node. The ultimate output of the power converter 100 is at $V_{OUT}$ across terminals V2+, V2−, particularly since the inductor L and the output capacitor $C_{OUT}$ are often external components with respect to an integrated circuit implementation of the core block 101.

The converter circuit 102 generally comprises a charge pump that includes a switched-capacitor network configured to boost or buck $V_{IN}$ to $V_{OUT}$. Examples of charge pumps include cascade multiplier, Dickson, Ladder, Series-Parallel, Fibonacci, and Doubler switched-capacitor networks, all of which may be configured as a multi-phase or a single-phase switched-capacitor network. A power converter 100 based on a charge pump converter circuit 102 uses capacitors to transfer charge from the input to the output of the power converter 100. These charge transfer capacitors are commonly known as "fly capacitors" or "charge pump capacitors" and may be external components coupled to an integrated circuit embodiment of the power converter 100. (It should be noted that while this disclosure distinguishes between a power converter 100 and a charge pump converter circuit 102, much of the literature labels the entire power converter 100 as a "charge pump").

FIG. 2 is a schematic diagram of a prior art power converter 200 that includes a divide-by-two Dickson charge pump 201. The illustrated charge pump 201, well-known by persons of ordinary skill, includes charge pump capacitors Cfly1, Cfly2 coupled as shown by switches controlled by two clock signals P1 and P2; accordingly, the switches are labeled by their respective phase clock and a letter reference—hence, P1a-P1c and P2a-P2c. In some embodiments, the switches P1x, P2x may be implemented as field effect transistors, particularly MOSFETS, within the charge pump 201. The illustrated charge pump capacitors Cfly1, Cfly2 may be included within an integrated circuit implementation of the charge pump 201, or may be external to the charge pump 201. The immediate output of the charge pump 201 is the $V_X$ node, while the ultimate output of the power converter 200 is at $V_{OUT}$.

As each phase of the charge pump 201 toggles, charge accumulates on the charge pump capacitors Cfly1, Cfly2 from $V_{IN}$, or is injected from the charge pump capacitors Cfly1, Cfly2 onto the intermediate capacitor $C_{VX}$. More specifically, when the P1x switches are closed and the P2x switches are open, then charge will flow to the $C_{VX}$ capacitor from the "bottom" plate of the charge pump capacitors Cfly1, Cfly2 along the paths indicated by arrows 202. Conversely, when the P1x switches are open and the P2x switches are closed, then charge will flow to the $C_{VX}$ capacitor from the "top" plate of the charge pump capacitors Cfly1, Cfly2 along the paths indicated by arrows 204. With a load 108 present at $V_{OUT}$, the $C_{VX}$ capacitor will discharge into the load 108 during each clock cycle and be refreshed periodically.

To improve efficiency, there are often two of the illustrated charge pumps 201 working in tandem, but just one is shown for simplicity. The inductor L can be quite small (in both value and size), making adiabatic charge pumps very attractive to industry.

A problem that can arise with conventional power converters 100 based on a charge pump converter circuit 102 is that the switches P1x, P2x and/or charge pump capacitors may be damaged if a $V_{OUT}$ short circuit event occurs and/or if $V_{IN}$ falls rapidly with respect to $V_X$ or $V_{OUT}$. Such events may occur, for example, during assembly of a power converter 100 with other components to make a system (e.g., a cell phone), during system test, and/or during operational use, such as when system power supplies are switched in or out of circuit.

Accordingly, there is a need to understand the failure mechanism for such damage. It is the purpose of this invention to resolve this issue in power converters based on a charge pump converter circuit without substantially decreasing the efficiency of such power converters.

SUMMARY

The present invention encompasses circuits and methods for protecting the switches of charge pump-based power converters from damage if a $V_{OUT}$ short circuit event occurs and/or if $V_{IN}$ falls rapidly with respect to $V_X$ or $V_{OUT}$. Embodiments of the present invention resolve this issue without substantially decreasing the efficiency of such power converters.

A general embodiment of the present invention includes a $V_X$ Detection Block coupled to the core block of a power converter. An input to the $V_X$ Detection Block is coupled to $V_X$. An output of the $V_X$ Detection Block, $\Delta V_X$ Detected, is coupled to a control circuit to disable operation of an associated converter circuit, such as by disabling the clock signals P1, P2 to the converter circuit of the power converter. The control circuit may be the controller for the core block, or alternatively may be any other control circuitry that disables operation of the associated converter circuit. The $V_X$ Detection Block detects large, rapid falls in $V_X$ during the dead time between clock phase signals, and, as a result, generates the $\Delta V_X$ Detected signal that disables or interrupts operation of the converter circuit (e.g., disable or interrupt the switches of a charge pump), thereby prevent damaging current spikes.

Some embodiments include a $V_{IN}$ Detection Block coupled to the core block of a power converter and configured to detect and prevent excessive in-rush current due to rapidly falling values of $V_{IN}$ to the power converter. One input to the $V_{IN}$ Detection Block is coupled to $V_{IN}$. In some embodiments, another input to the $V_{IN}$ Detection Block is coupled to $V_X$ or to $V_{OUT}$. An output of the $V_{IN}$ Detection Block, $\Delta V_{IN}$ Detected, is coupled to a control circuit to disable operation of an associated converter circuit, such as by disabling the clock signals P1, P2 to the converter circuit of the power converter. The control circuit may be the controller for the core block, or alternatively may be any other control circuitry that disables operation of the associated converter circuit.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods for protecting the switches of charge pump-based power converters from damage if a $V_{OUT}$ short circuit event occurs and/or if $V_{IN}$ falls rapidly with respect to $V_X$ or $V_{OUT}$.

Embodiments of the present invention resolve this issue without substantially decreasing the efficiency of such power converters.

Short Circuit Events

Figure 1:
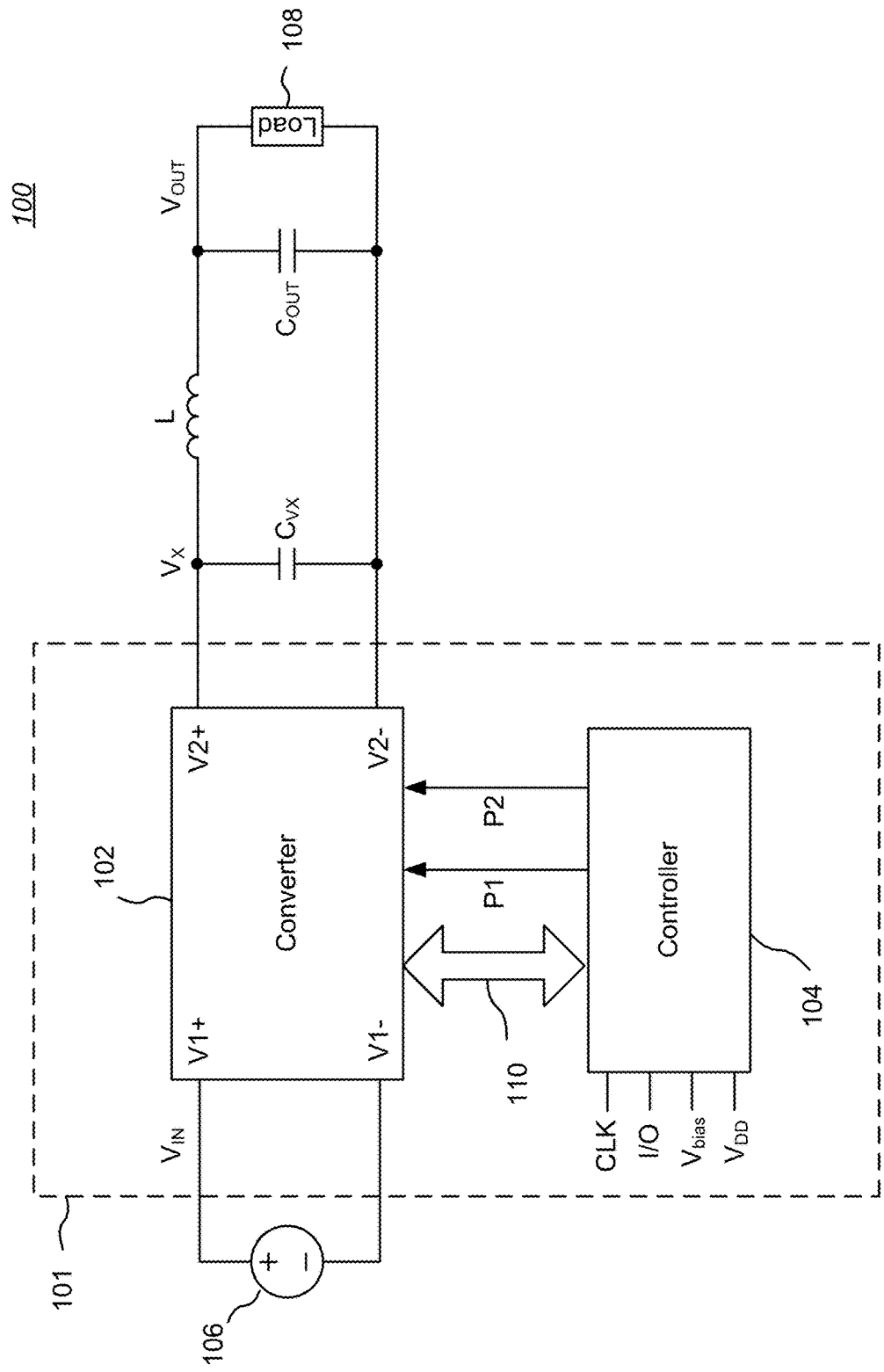
FIG. 1 is a block diagram showing a prior art adiabatic DC-to-DC power converter.
Figure 2:
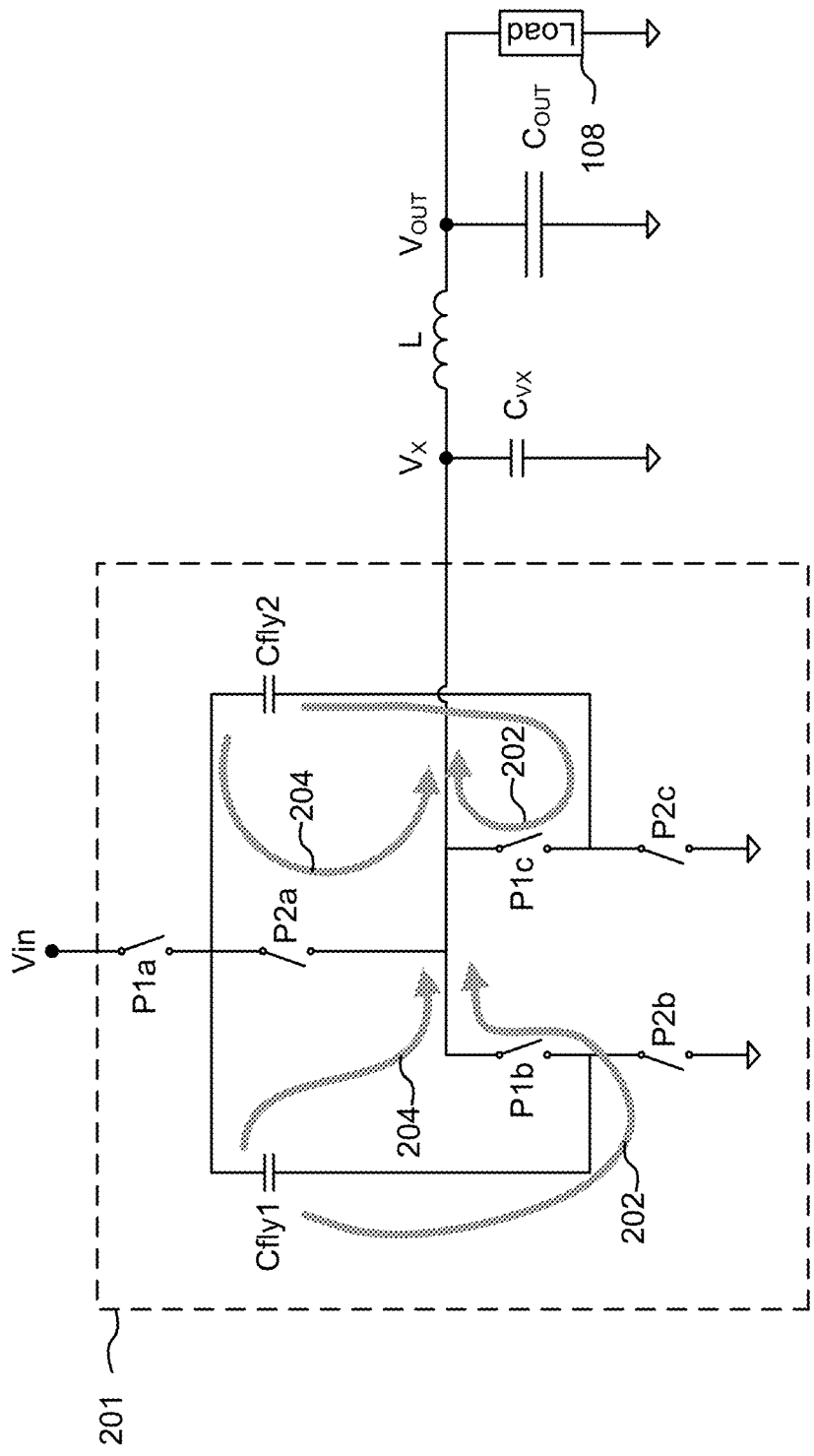
FIG. 2 is a schematic diagram of a prior art power converter that includes a divide-by-two Dickson charge pump.

Upon careful investigation of the failure mechanism for damage that occurs during a short circuit event, a number of novel insights were gained. To describe one aspect of the problem, and using FIG. 2 as an example, consider that if the ultimate output, $V_{OUT}$, of the power converter 200 is shorted to ground, $C_{OUT}$ will start to discharge, initially at a rate of about $R_{SHORT} \times C_{OUT}$ (the discharge rate will be slowed as the charge pump 201 adds charge to the output at $V_X$). As $V_{OUT}$ falls, the output current of the charge pump 201 will increase and hence $V_X$ will be maintained—initially—at or near its pre-short value. This then results in a voltage difference across the adiabatic inductor L. Consequently, current will increase in the inductor L according to the well-known inductor equation: $V = L \times dI/dt$.

While the ultimate output of the power converter 200 is shorted, $V_X$ will initially cycle back close to its nominal value as $V_{OUT}$ falls because the charge held across the charge pump capacitors Cfly1, Cfly2 increases to compensate (during clock phase P1, the charge pump capacitors Cfly1, Cfly2 charge to $V_{IN} - V_X$, so as $V_X$ falls, more charge is stored on the charge pump capacitors). However, the current into $V_{OUT}$ increases far beyond the capability of the charge pump 201 to replenish charge, and thus all voltage nodes start to fall.

Figure 3:
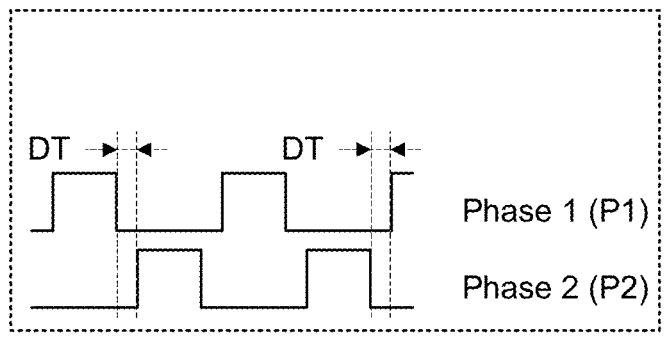
FIG. 3 is a graph of the ON and OFF states of the clock signals P1 and P2 over time.
Figure 4:
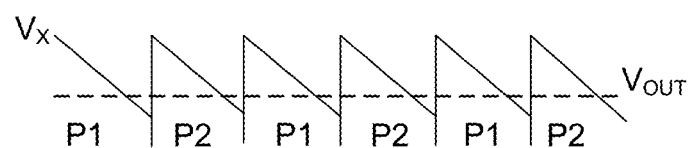
FIG. 4 is a graph showing the relative values of $V_X$ and $V_{OUT}$ during a sequence of the clock signals P1, P2.

A critical and inventive insight into the problem of damage from a $V_{OUT}$ short circuit event is that the dead time between the clock signals P1 and P2 causes an unusual phenomenon. FIG. 3 is a graph 300 of the ON and OFF states of the clock signals P1 and P2 over time. In order to avoid a "shoot through" condition (which wastes charge, thus reducing efficiency) due to an overlap of the clock signals P1, P2, each clock signal is set to an OFF (low) state before the other clock signal is set to an ON (high) state, resulting in a dead time DT between the clock signals P1, P2. As a result, during normal operation of the charge pump 201, $V_X$ is no longer replenished by the charge pump 201 and the value of $V_X$ accordingly declines and dips below $V_{OUT}$ during the dead time DT by a small amount (less than about 100 millivolts). FIG. 4 is a graph 400 showing the relative values of $V_X$ and $V_{OUT}$ during a sequence of the clock signals P1, P2 (note that the relative values of $V_X$ and $V_{OUT}$ may not be to scale).

Figure 5:
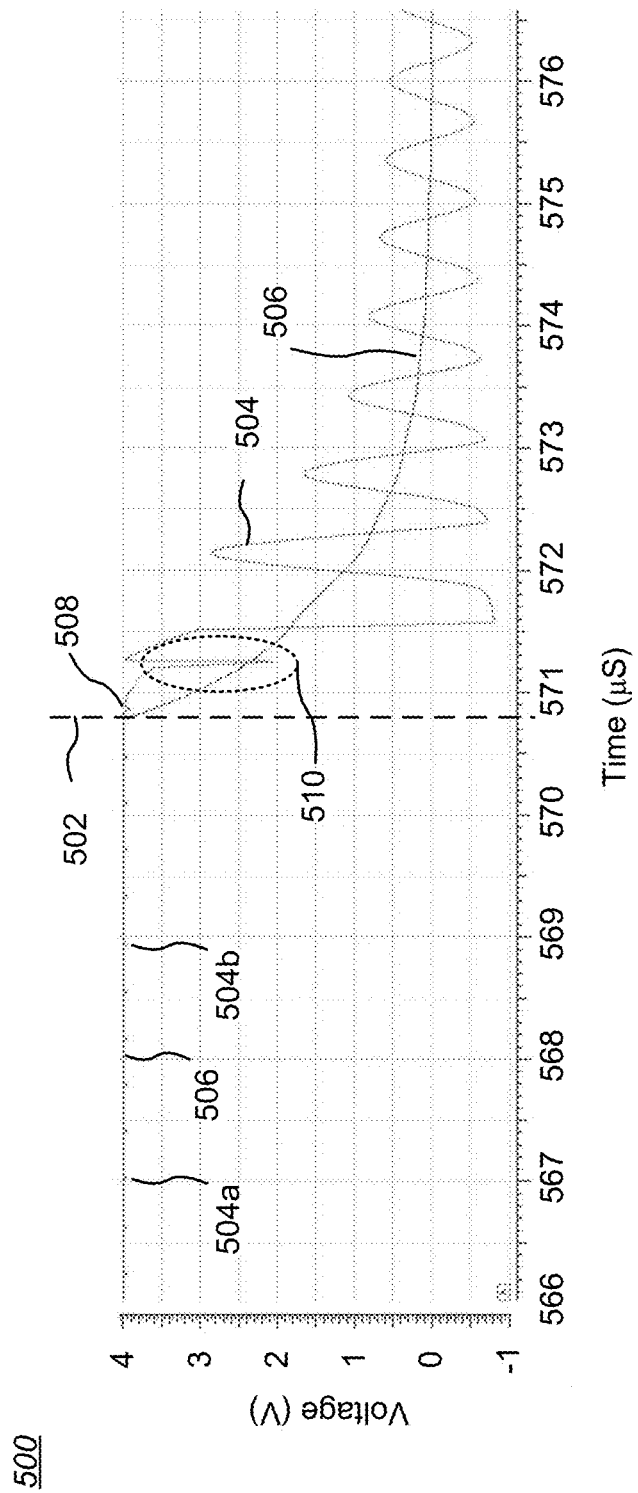
FIG. 5 is a graph showing the values of $V_X$ and $V_{OUT}$ as a function of time, both before and after a short circuit event across $V_{OUT}$.

It was realized that during the dead time DT between the clock signals P1, P2, the increasing current in the adiabatic inductor L can only be supplied by the relatively small $C_{VX}$ capacitor. Hence, negative excursions ("spikes") on $V_X$ increase significantly, from a normal range (generally measured in tens of millivolts) to an overvoltage range that may be several volts. For example, FIG. 5 is a graph 500 showing the values of $V_X$ and $V_{OUT}$ as a function of time, both before and after a short circuit event across $V_{OUT}$. Before a short circuit event indicated by a vertical dashed line 502, the value of $V_X$ (indicated by graph lines 504a, 504b as example points only) makes only small excursions below $V_{OUT}$ (indicated by graph line 506) during the dead time DT. Thus, the pre-short circuit behavior is the same as shown in FIG. 4 (but the scale of relative values for of $V_X$ and $V_{OUT}$ in FIG. 5 is more accurate). After the short circuit event indicated by the dashed line 502, $V_{OUT}$ steadily falls towards zero volts at the output capacitor $C_{OUT}$ discharges. However, while a first negative excursion of $V_X$ at graph line 508 may be relatively small, $V_X$ exhibits a significant multi-volt negative excursion with respect to $V_{OUT}$ during a dead time DT intervals, as shown within the dotted oval 510. This multi-volt negative excursion is potentially quite damaging to the switches and/or charge pump capacitors of a power converter 200. After the multi-volt negative excursion at $V_X$ shown within the dotted oval 510, generally the power converter 200 will be turned OFF, but $V_X$ will oscillate as energy is still in the resonant tank circuit formed by the inductor L and the $C_{VX}$ capacitor; the frequency of oscillation is $1/(2\pi \times \mathrm{sqrt}(LC_{VX}))$.

The dead time excursions of $V_X$ with respect to $V_{OUT}$ during a short circuit event, as exemplified in FIG. 5, results in a damaging voltage spike, Vsp. A large Vsp spike results in a high in-rush current spike through the charge pump 201. In integrated circuit implementations, parasitic inductances exist (for example, due to on-die conductor routing and printed circuit board conductor routing) which transform a current spike to a voltage spike. Such voltage spikes electrically overstress the charge pump switches, affecting their reliability, potentially to destruction.

For example, in normal operation, in-rush current to the switches of the charge pump 201, such as during startup, is limited. The charge pump switches may have a very low ON resistance (e.g., 1-10 milliohms). During the dead time DT of a short circuit event, Vsp may be several volts due to $V_X$ falling significantly during the dead time DT. Accordingly, when the switches close and Vsp is large, very large in-rush current spikes occur as the charge pump capacitors charge. Because of Ohm's Law (I=V/R), the combination of very low ON resistance in the charge pump switches and small parasitic inductances can create a large Vsp which can then damage the switches. As a more specific example, assume that a pump switch has a 10 milliohm resistance and $V_X$ across the $C_{VX}$ capacitor droops by only 1V (i.e., Vsp=1V). Ohm's law gives a current of I=V/R=100 A. Inductor theory states that $V=L \times dI/dt$. So a 100 A current spike happens very quickly as the pump switches open and close, typically in 1-2 ns. A typical damage threshold for the pump switches may be about 10V. For a 1 ns 100 A pulse to generate 10V across the pump switches, the parasitic inductance needs only to be $L = V/(dI/dt) = 100$ pH. This is tiny given that parasitic inductances (e.g., PCB traces, on-die conductor routing) are often measured in nH (i.e., more than 10 times larger than 100 pH). Accordingly, a 1 ns 100 A pulse may generate much more than 10V across the pump switches. Of note, this problem arises with many types of converter circuits 102, and not just the charge pump 201 configuration of FIG. 2.

While higher voltage switches could be used for robustness, the larger size of such switches can make an IC embodiment uncompetitive. In conventional designs, excess current in-rush to a charge pump has been measured by monitoring $I_{OUT}$ for an over-current condition, but conventional designs measure the average DC output current over the switching period of the charge pump and not the much faster current spikes that can occur during the dead time DT, thus allowing damaging over-currents and voltages to remain undetected. A short circuit detection circuit at $V_{OUT}$ may also be added to shut down the charge pump 201 if $V_{OUT}$ drops by at a certain percentage, such as 80% of the nominal $V_{OUT}$ value, but such circuits are not fast enough to prevent damage to the charge pump switches for low-ohmic shorts during the dead time DT. Accordingly, there remains a strong need for a reliable detection technique that can protect critical charge pump circuitry from output short circuits. One aspect of embodiments of the present invention is to provide charge pump protection against dead time short circuits without any significant decrease in conversion efficiency or the addition of substantial power-consuming circuitry.

Figure 6:
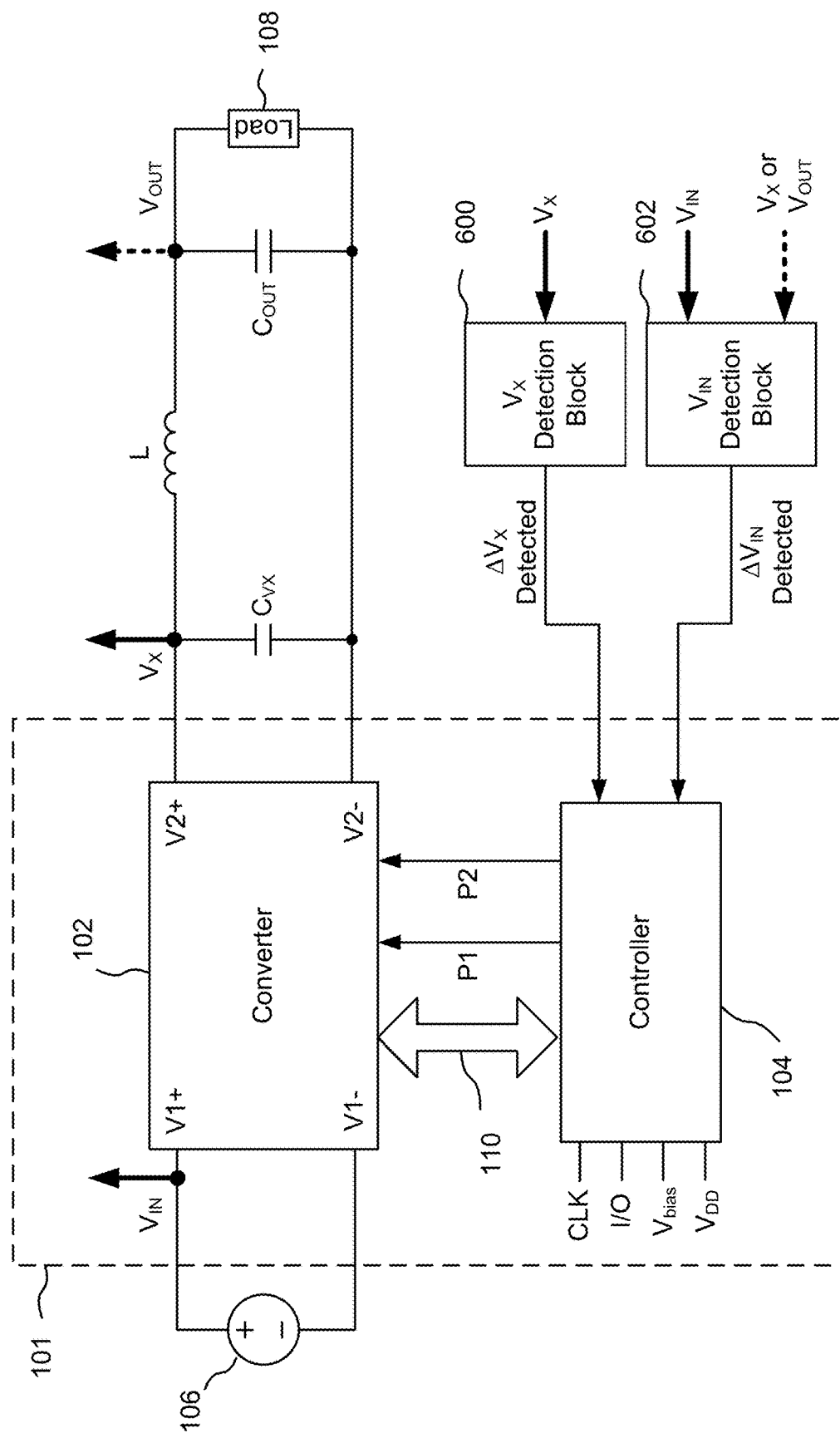
FIG. 6 is a block diagram of a general embodiment of the present invention, including a $V_X$ Detection Block coupled to the core block 101 of a power converter.

FIG. 6 is a block diagram of a general embodiment of the present invention, including a $V_X$ Detection Block 600 coupled to the core block 101 of a power converter. An input to the $V_X$ Detection Block 600 is coupled to $V_X$. An output of the $V_X$ Detection Block 600, $\Delta V_X$ Detected, is coupled to a control circuit to disable operation of an associated converter circuit 102 of the power converter and/or the entire power converter, such as by disabling the clock signals P1, P2 to the converter circuit 102 or causing the power converter to enter a safe mode of operation (for example, a safe discharge mode or high switch resistance mode). The control circuit may be the controller 104 for the core block 101, or alternatively may be any other control circuitry that can disable operation of the associated converter circuit 102 and/or the entire power converter, or cause the power converter to enter a safe mode of operation.

The $V_X$ Detection Block 600 should detect large, rapid falls in $V_X$ during the dead time DT between clock phase signals, and, as a result, generate a $\Delta V_X$ Detected signal that disables or interrupts operation of the converter circuit 102 (e.g., disable or interrupt the switches of a charge pump), thereby prevent damaging current spikes. As stated above, a large and rapid drop in $V_X$ occurs during the dead time DT between the clock signals P1, P2 when a short circuit event occurs. Since the dead time DT is typically on the order of about 10 to 50 nanoseconds, the $V_X$ Detection Block 600 and the control circuit should have very short response times. The $V_X$ Detection Block 600 should also avoid overly loading the $V_X$ line, which would deteriorate efficiency.

Figure 7:
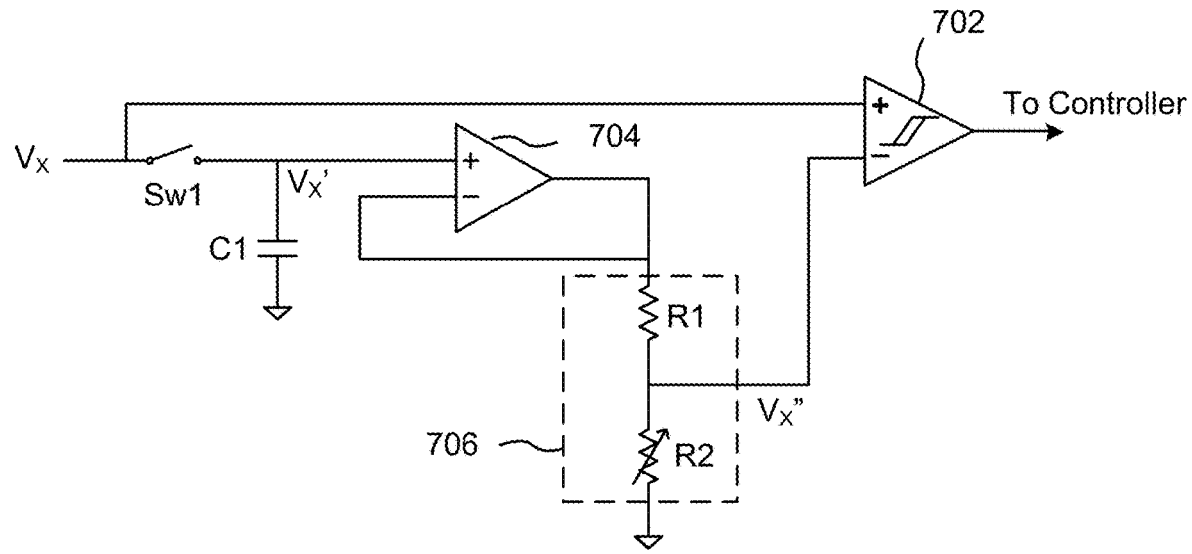
FIG. 7 is a schematic diagram of a first embodiment of a circuit suitable for use as the $V_X$ Detection Block of FIG. 6.

FIG. 7 is a schematic diagram of a first embodiment of a circuit suitable for use as the $V_X$ Detection Block 600 of FIG. 6. The voltage $V_X$ is applied to a first input of a comparator 702 and to a switch Sw1. The switch Sw1 is normally closed, allowing $V_X$ to be applied to a shunt-connected capacitor C1 and to a first input of an op-amp 704 that isolates the capacitor C1 from down-stream circuitry. A resistive divider 706 comprising series-coupled resistors R1 and R2 is coupled between the output of the op-amp 704 and a reference potential, such as circuit ground. The output of the op-amp 704 is also fed back to a second input of the op-amp 704. Accordingly, the op-amp 704 functions as a voltage follower with respect to the voltage across the capacitor C1. A node between the series-coupled resistors R1 and R2 is coupled to a second input of the comparator 702 and provides a scaled voltage to the comparator 702. In some embodiment, one or both of the resistors R1 and R2 may be settable or variable in order to provide a desired scaled voltage to the comparator 702 (only R2 is shown as variable in the illustrated example).

In operation, the switch Sw1 would be opened at a point just before each dead time DT interval in order to sample the voltage on $V_X$ at that moment of time and hold that sampled voltage, $V_X'$, on the capacitor C1. The sampled-and-held voltage value, $V_X'$, is propagated by the op-amp 704 and scaled by the resistive divider 706, the output of which, $V_X''$, is then compared to the then—current value of $V_X$ by the comparator 702. If the actual $V_X$ value should fall below the sampled and scaled value $V_X''$, then the output of the comparator 702 would change state, which may be used to command a control circuit (e.g., the controller 104) to, for example, disable operation of the associated converter circuit 102 (e.g., by interrupting the clock signals P1, P2 driving the converter circuit 102) and/or the entire power converter, or cause the power converter to enter a safe mode of operation.

Figure 8:
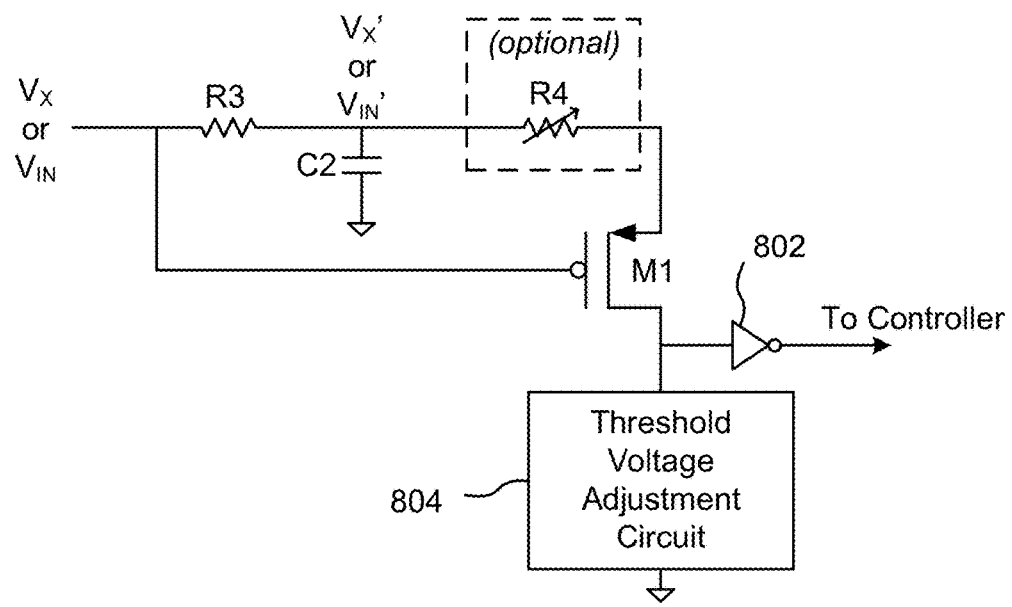
FIG. 8 is a schematic diagram of a second embodiment of a circuit suitable for use as the $V_X$ Detection Block of FIG. 6.

FIG. 8 is a schematic diagram of a second embodiment of a circuit suitable for use as the $V_X$ Detection Block 600 of FIG. 6. In this embodiment, $V_X$ is applied to a resistor R3 and to the gate of an enhancement-mode PMOS FET M1. The output of the resistor R3 is coupled to a shunt-connected capacitor C2 and to the source of the PMOS FET M1. The output (drain) of the PMOS FET M1 is coupled to an inverter 802 and to a threshold voltage adjustment circuit 804 that may comprise a small current source or a resistor that provides a voltage drop (V=I×R) to adjust the relative threshold voltage of the PMOS FET M1 as needed. In the illustrated example, the threshold voltage adjustment circuit 804 is coupled to a reference potential, such as circuit ground.

In operation, the resistor R3 and capacitor C2 function as a filter, removing small spikes in $V_X$ and outputting an averaged value $V_X'$. While the filtered (averaged) value $V_X'$ applied to the source of the PMOS FET M1 is equal to the value of $V_X$ applied to the gate of the PMOS FET M1 (i.e., $V_S = V_G$), then the PMOS FET M1 will be OFF (non-conducting). Accordingly, the input to the inverter 802 will be in a first logic state (e.g., "1") and the output of the inverter 802 will be in an inverted second logic state (e.g., "0"). However, if $V_X$ rapidly falls below $V_X'$ by at least the threshold voltage $V_T$ of the PMOS FET M1, then the PMOS FET M1 will be ON (conducting), since $V_S < V_G$. Accordingly, the input to the inverter 802 will be in the second logic state (e.g., "0") and the output of the inverter 802 will be inverted to the first logic state (e.g., "1"). Thus, the change in state of the inverter 802 output may be used to command a control circuit (e.g., the controller 104) to, for example, disable operation of the associated converter circuit 102 (e.g., by interrupting the clock signals P1, P2 driving the converter circuit 102) and/or the entire power converter, or cause the power converter to enter a safe mode of operation.

An optional source degeneration resistor R4, which may be tunable or settable, may be coupled between a node coupling resistor R3 and capacitor C2, and the source of the PMOS FET M1. The value of the resistor R4 may be selected to adjust the effective threshold voltage $V_T$ of the PMOS FET M1, for example, to compensate for process and temperature variations in $V_T$. In some embodiments, the resistor R4 may have a programmable value that can be dynamically altered by a temperature measurement circuit (not shown) to counter temperature-induced changes in the threshold voltage $V_T$ of the PMOS FET M1 or to adjust its apparent threshold voltage, in known fashion. In some embodiments, it may be useful to configure the threshold voltage adjustment circuit 804 to counter temperature-induced changes in the threshold voltage $V_T$ of the PMOS FET M1, again in known fashion.

Figure 9:
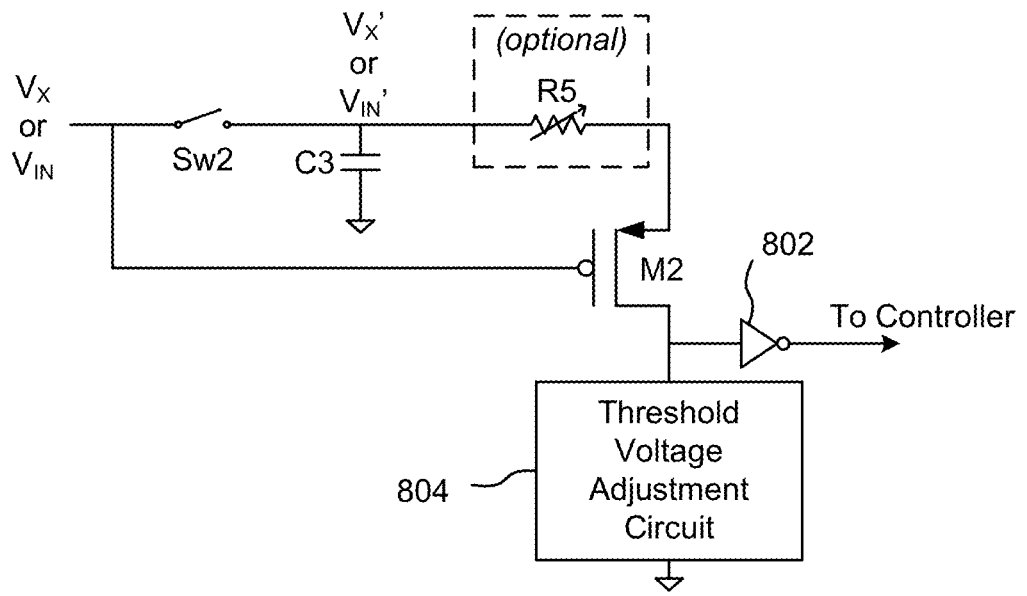
FIG. 9 is a schematic diagram of a third embodiment of a circuit suitable for use as the $V_X$ Detection Block of FIG. 6.

FIG. 9 is a schematic diagram of a third embodiment of a circuit suitable for use as the $V_X$ Detection Block 600 of FIG. 6. The voltage $V_X$ is applied to a switch Sw2, which is normally closed, allowing $V_X$ to be applied to a shunt-connected capacitor C3 and to the source of an enhancement-mode PMOS FET M2. The voltage $V_X$ is also coupled to the gate of the PMOS FET M2. The output (drain) of the PMOS FET M2 is coupled to an inverter 802 and a threshold voltage adjustment circuit 804, as in FIG. 8. An optional source degeneration resistor R5, which may be tunable or settable, may be coupled between the voltage $V_X'$ at the capacitor C3 and the source of the PMOS FET M2. The value of the resistor R5 may be selected to adjust the effective threshold voltage $V_T$ of the PMOS FET M2.

In operation, the switch Sw2 would be opened at a point just before each dead time DT interval in order to sample the voltage on $V_X$ at that moment of time and hold that sampled voltage, $V_X'$, on the capacitor C3. While $V_X$ as applied to the gate of the PMOS FET M2 is equal to the sampled-and-held voltage value $V_X'$ applied to the source of the PMOS FET M2 (i.e., $V_S=V_G$), then the PMOS FET M2 will be OFF (non-conducting). Accordingly, the input to the inverter 802 will be in a first logic state (e.g., "1") and the output of the inverter 802 will be in an inverted second logic state (e.g., "0"). However, if $V_X$ rapidly falls below $V_X'$ by at least the threshold voltage $V_T$ of the PMOS FET M2, then the PMOS FET M2 will be ON (conducting). Accordingly, the input to the inverter 802 will be in the second logic state (e.g., "0") and the output of the inverter 802 will be inverted to the first logic state (e.g., "1"). Thus, the change in state of the inverter 802 output may be used to command a control circuit (e.g., the controller 104) to, for example, disable operation of the associated converter circuit 102 (e.g., by interrupting the clock signals P1, P2 driving the converter circuit 102) and/or the entire power converter, or cause the power converter to enter a safe mode of operation.

Advantages of the embodiment of FIG. 9 include that the circuit may be operated independent of the converter circuit clock signal (P1, P2) frequency, the circuit requires no high-power consuming circuitry (such as high bandwidth op-amps or comparators), and the circuit is quite small in IC area (e.g., embodiments may be 10-20 smaller than the circuit of FIG. 8). Embodiments of the circuit shown in FIG. 9 solution may be configured to have a very fast response time and so can easily protect a converter circuit 102. Some embodiments have a response time of about 5 ns, well-less than a typical dead time duration of 10 ns or more.

As should be appreciated, other circuits may be used to implement the $V_X$ Detection Block 600 of FIG. 6 now that this disclosure makes clear the connection between dead time DT and $V_X$ drop with respect to $V_{OUT}$ leading to excessive in-rush current and resulting switch damage in a converter circuit. Further, the converter circuit, the control circuit, the voltage node $V_X$, and the $V_X$ Detection Block 600 may be embodied in a single integrated circuit die.

Falling $V_{IN}$ Events in Adiabatic Charge Pumps

Some of the circuits described above for preventing excessive in-rush current during dead time periods concurrent with short circuit events by monitoring for rapid changes in $V_X$ are also useful for preventing excessive in-rush current due to rapidly falling values of $V_{IN}$.

To understand the problem of rapidly falling values of $V_{IN}$, it may be useful to refer back to FIG. 2 as one example of a divide-by-two adiabatic converter circuit. When the charge pump 201 operates normally, the circuit is considered to be "balanced". During the cycle period when the clock signal P1 in ON and the clock signal P2 is OFF, then charge equal to $V_{IN}-V_X$ accumulates across the charge pump capacitors Cfly1, Cfly2. For example, if $V_{IN}=10V$, then the divide-by-two voltage $V_X=5V$, and the charge across the charge pump capacitors Cfly1, Cfly2 is thus 5V. During the cycle period when the clock signal P1 in OFF and the clock signal P2 is ON, then the charge pump capacitors Cfly1, Cfly2 are switched to ground and hence $V_X$ (and $V_{OUT}$) are refreshed with charge; in this example, to 5V. Accordingly, during normal balanced operation, the voltage differential across any switch (P1x and P2x in this example) is very small and in-rush current is limited.

However, if $V_{IN}$ falls rapidly (for example, from 10V to 9V), then the charge that accumulates across the charge pump capacitors Cfly1, Cfly2 is $V_{IN}-V_X$, or 4V in this numeric example. When the charge pump capacitors Cfly1, Cfly2 are then coupled to the $C_{VX}$ and $C_{OUT}$ capacitors, previously charged to $V_X$ and $V_{OUT}$ values of 5V before the rapid fall of $V_{IN}$, then a voltage differential of 1V is present across the P2x switches. If each P2x switch has an ON resistance of 5 milliohms, then 200 A could momentarily flow in those switches. This level of current spike, in combination with parasitic inductances, can produce voltage spikes that are high enough to damage the switches. Note that if $V_{IN}$ falls relatively slowly (e.g., over several charge pump cycles), the switches will not be damaged, and charge is transferred from $V_{OUT}$ back to $V_{IN}$ as a ×2 function (i.e., multiplication from $V_{OUT}$ to $V_{IN}$, rather than normal division from $V_{IN}$ to $V_{OUT}$).

Thus, as in the case of excessive in-rush current during dead time periods concurrent with short circuit events caused by rapid changes in $V_X$, excessive in-rush current can be caused by rapidly falling values of $V_{IN}$ to a converter circuit 102. There are several reasons why $V_{IN}$ may fall rapidly and cause damage, including (but not limited to): a fault in the power supply providing $V_{IN}$; a user switching from a mains supply to a battery; a sudden fault in a battery pack; a sudden drain on a power supply source for $V_{IN}$ by another circuit that results in $V_{IN}$ dropping; a damage to a capacitor coupled to $V_{IN}$; and/or a short circuit. Ideally, in any of these cases, the converter circuit 102 should not be damaged.

Referring to FIG. 6, in addition to the $V_X$ Detection Block 600 described above, a $V_{IN}$ Detection Block 602 may be included. One input to the $V_{IN}$ Detection Block 602 is coupled to $V_{IN}$. As described in greater detail below, in some embodiments, another input to the $V_{IN}$ Detection Block 602 is coupled to $V_X$ or to $V_{OUT}$. An output of the $V_{IN}$ Detection Block 602, $\Delta V_{IN}$ Detected, is coupled to a control circuit to disable operation of an associated converter circuit 102, such as by disabling the clock signals P1, P2 to the converter circuit 102. The control circuit may be the controller 104 for the core block 101, or alternatively may be any other control circuitry that disables operation of the associated converter circuit 102.

The $V_{IN}$ Detection Block 602 should detect large, rapid falls in $V_{IN}$, and, as a result, generate a $\Delta V_{IN}$ Detected signal that disables or interrupts operation of the converter circuit 102 (e.g., disable or interrupt the switches of a charge pump), thereby prevent damaging current spikes. The $V_{IN}$ Detection Block 602 may detect large, rapid falls in $V_{IN}$ on an absolute basis, or may compare $V_{IN}$ to $V_X$ or $V_{OUT}$ to determine if $V_{IN}$ has fallen below the correct multiple of $V_X$ or $V_{OUT}$ corresponding to the boost or buck factor of a particular converter circuit 102. The $V_{IN}$ Detection Block 602 and the control circuit should have relatively short response times (e.g., around 500 ns or less), but in most cases need not be as fast as the $V_X$ Detection Block 600. The $V_{IN}$ Detection Block 602 should also avoid overly loading the $V_X$ line, which would deteriorate efficiency.

Figure 10:
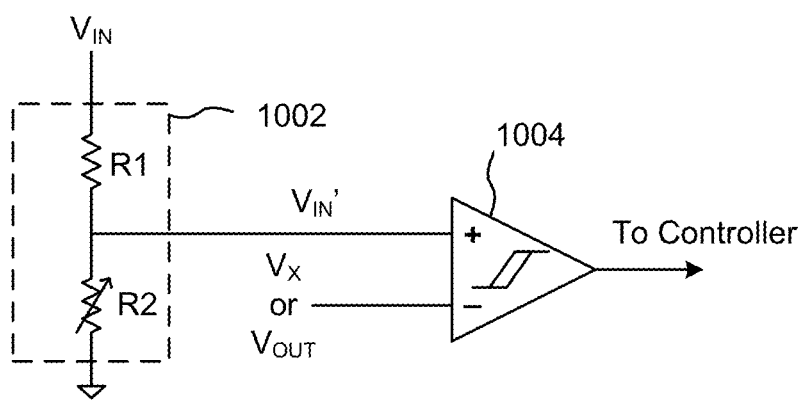
FIG. 10 is a schematic diagram of a first embodiment of a circuit suitable for use as the $V_{IN}$ Detection Block of FIG. 6.

FIG. 10 is a schematic diagram of a first embodiment of a circuit suitable for use as the $V_{IN}$ Detection Block 602 of FIG. 6. The voltage $V_{IN}$ is coupled to a scaling circuit 1002, shown as a resistive divider comprising series-coupled resistors R1 and R2 coupled between $V_{IN}$ and a reference potential, such as circuit ground. A node between the series-coupled resistors R1 and R2 is coupled to a first input of a comparator 1004 and provides a scaled voltage $V_{IN}'$ to the comparator 1004 (preferably just below the usual operational level of $V_X$). A second input of the comparator 1004 is coupled to either $V_X$ or $V_{OUT}$; $V_X$ may be preferred over $V_{OUT}$ as being closer to the switches P1x, P2x in the converter circuit 102 and not affected as much by the inductor L. In some embodiments, one or both of the resistors R1 and R2 may be settable or variable in order to provide a desired scaled voltage to the comparator 1004 (only R2 is shown as variable in the illustrated example).

In operation, $V_{IN}$ is scaled by the scaling circuit 1002, the output of which, $V_{IN}'$, is then compared to the then-current value of $V_X$ (or $V_{OUT}$) by the comparator 1004. If $V_{IN}'$ should rapidly fall below $V_X$ (or $V_{OUT}$), then the output of the comparator 1004 would change state, which may be used to command a control circuit (e.g., the controller 104) to disable operation of the associated converter circuit 102 (e.g., by interrupting the clock signals P1, P2 driving the converter circuit 102). Note that in some embodiments, filtering and hysteresis circuits may be added to filter out glitches and spikes from $V_{IN}$ and $V_X$ (or $V_{OUT}$). The circuit shown in FIG. 10 is particularly useful for step-down (buck) power converters.

The circuit of FIG. 8 may also be used to implement the $V_{IN}$ Detection Block 602 of FIG. 6. The circuit would work as described above, except that the input would be $V_{IN}$ rather than $V_X$, and the filtered (averaged) value would be $V_{IN}'$ rather than $V_X'$. The values of R3 and C2 may be selected to result in an RC time constant that ensures a minimal voltage fall for $V_{IN}$ over one clock cycle of the converter circuit 102. In operation, while the filtered (averaged) value of $V_{IN}$ applied to the source of the PMOS FET M1 is equal to the value of $V_{IN}$ applied to the gate of the PMOS FET M1, then the PMOS FET M1 will be OFF, the input to the inverter 802 will be in a first logic state, and the output of the inverter 802 will be in an inverted second logic state. However, if $V_{IN}$ rapidly falls below the filtered (averaged) value of $V_{IN}$ by at least the threshold voltage $V_T$ of the PMOS FET M1, then the PMOS FET M1 will be ON, the input to the inverter 802 will be in the second logic state, and the output of the inverter 802 will be inverted to the first logic state. Thus, the change in state of the inverter 802 output may be used to command a control circuit (e.g., the controller 104) to, for example, disable operation of the associated converter circuit 102 (e.g., by interrupting the clock signals P1, P2 driving the converter circuit 102) and/or the entire power converter, or cause the power converter to enter a safe mode of operation. As described above, an optional source degeneration resistor R4 may be coupled between a node coupling resistor R3 and capacitor C2, and the source of the PMOS FET M1, to allow adjustment of the effective threshold voltage $V_T$ of the PMOS FET M1.

Similarly, the circuit of FIG. 9 may also be used to implement the $V_{IN}$ Detection Block 602 of FIG. 6. The circuit would work as described above, except that the input would be $V_{IN}$ rather than $V_X$, and the sampled-and-held value would be $V_{IN}'$ rather than $V_X'$. In operation, the switch Sw2 would be opened periodically in order to sample the voltage on $V_{IN}$ at that moment of time and hold that sampled voltage, $V_{IN}'$, on the capacitor C3. While $V_{IN}$ as applied to the gate of the PMOS FET M2 is equal to the sampled-and-held voltage value $V_{IN}'$ applied to the source of the PMOS FET M2 (i.e., $V_S=V_G$), then the PMOS FET M2 will be OFF (non-conducting). Accordingly, the input to the inverter 802 will be in a first logic state (e.g., "1") and the output of the inverter 802 will be in an inverted second logic state (e.g., "0"). However, if $V_{IN}$ rapidly falls below $V_{IN}'$ by at least the threshold voltage $V_T$ of the PMOS FET M2, then the PMOS FET M2 will be ON (conducting). Accordingly, the input to the inverter 802 will be in the second logic state (e.g., "0") and the output of the inverter 802 will be inverted to the first logic state (e.g., "1"). Thus, the change in state of the inverter 802 output may be used to command a control circuit (e.g., the controller 104) to, for example, disable operation of the associated converter circuit 102 (e.g., by interrupting the clock signals P1, P2 driving the converter circuit 102) and/or the entire power converter, or cause the power converter to enter a safe mode of operation. As described above, an optional source degeneration resistor R5 may be coupled between the voltage $V_{IN}'$ at the capacitor C3 and the source of the PMOS FET M2 to allow adjustment of the effective threshold voltage $V_T$ of the PMOS FET M1.

As should be appreciated, other circuits may be used to monitor $V_{IN}$, including variants of the circuit shown in FIG. 7. Of note, use of the circuits of FIGS. 7, 8, and 9 for the $V_{IN}$ Detection Block 602 of FIG. 6 require monitoring of only $V_{IN}$, and thus impose no load on $V_X$ or $V_{OUT}$. Further, the converter circuit, the control circuit, and the $V_{IN}$ Detection Block 602 may be embodied in a single integrated circuit die.

System Aspects

Embodiments of the present invention may be used to protect many types of power converters, including buck and/or boost power converters, and whether or not of an adiabatic inductor design, in which even a low voltage difference between the charge pump capacitors and $V_X$ may cause high in-rush currents leading to a large voltage spike across switch devices, particularly MOSFET switches.

Embodiments of the present invention provide circuits and methods for protecting the switches of charge pump-based power converters from damage if a $V_{OUT}$ short circuit event occurs and/or if $V_{IN}$ falls rapidly with respect to $V_X$ or $V_{OUT}$, all without substantially decreasing the efficiency of such power converters. As a person of ordinary skill in the art will understand, a system architecture is beneficially impacted by the current invention in critical ways, including greater reliability and durability.

Methods

Figure 11:
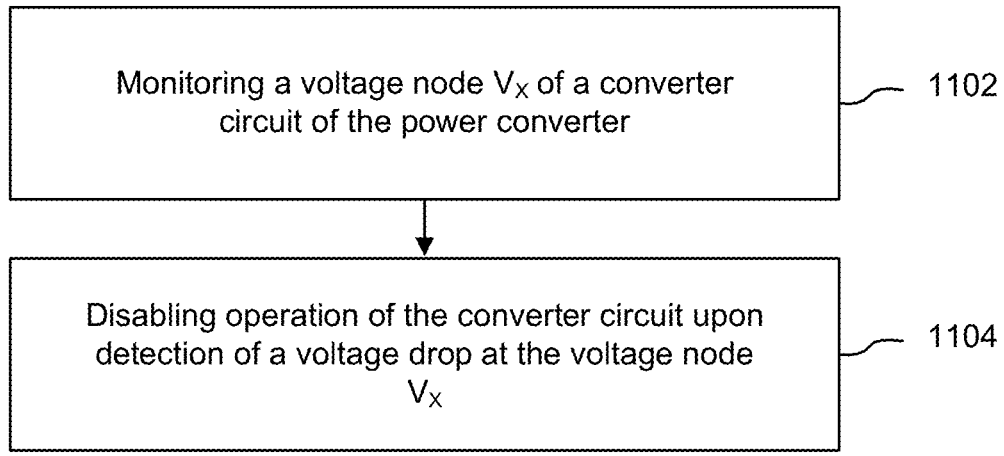
FIG. 11 is a process flow chart showing a first method for protecting a power converter from in-rush current.

Another aspect of the invention includes methods for protecting a power converter from in-rush current. For example, FIG. 11 is a process flow chart 1100 showing a first method for protecting a power converter from in-rush current. The method includes monitoring a voltage node $V_X$ of a converter circuit of the power converter (Block 1102); and disabling operation of the converter circuit upon detection of a voltage drop (especially a large, rapid voltage drop) at the voltage node $V_X$ (Block 1104). An additional aspect of the above method may include monitoring the voltage node $V_X$ for a voltage drop that occurs during a dead time between non-overlapping clock signals controlling operation of the converter circuit.

Figure 12:
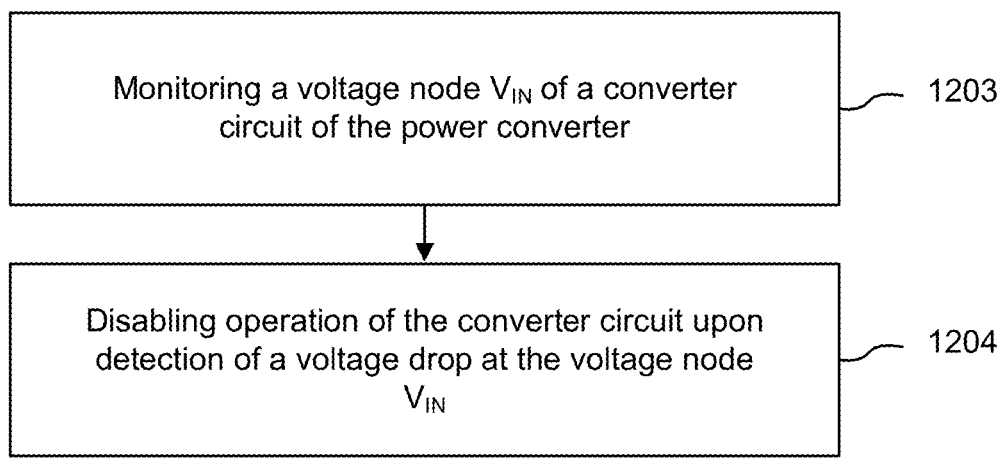
FIG. 12 is a process flow chart showing a second method for protecting a power converter from in-rush current.

As another example, FIG. 12 is a process flow chart 1200 showing a second method for protecting a power converter from in-rush current. The method includes monitoring a voltage node $V_{IN}$ of a converter circuit of the power converter (Block 1102); and disabling operation of the converter circuit upon detection of a voltage drop (especially a large, rapid voltage drop) at the voltage node $V_{IN}$ (Block 1104). An additional aspect of the above method may include detecting a voltage drop of the input voltage $V_{IN}$ relative to one of an output voltage $V_{OUT}$ of the power converter or a voltage node $V_X$ of the converter circuit.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form an end product such as a cellular telephone, laptop computer, or electronic tablet, or to form a higher level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A power converter including:
(a) a converter circuit configured to convert an input voltage $V_{IN}$ to a different output voltage $V_{OUT}$;
(b) a control block for disabling operation of the converter circuit;
(c) a voltage node $V_X$ between the converter circuit and the output $V_{OUT}$;
(d) a $V_{IN}$ detection block, coupled to the input voltage $V_{IN}$ and to the control block, and optionally coupled to one of $V_{OUT}$ or the voltage node $V_X$, and configured to detect a voltage drop in the input voltage $V_{IN}$ and generate a control signal to the control block to disable operation of the converter circuit;
wherein the converter circuit is coupled to a source of at least two non-overlapping clock signals having ON states separated by a dead time, and wherein the $V_{IN}$ detection block is configured to detect the voltage drop in the input voltage $V_{IN}$ during the dead time.

2. The power converter of claim 1, wherein the $V_{IN}$ detection block is configured to detect a voltage drop in the input voltage $V_{IN}$ where the voltage drop has a magnitude that induces damage to the converter circuit.

3. The power converter of claim 1, wherein the converter circuit, the control block, the voltage node $V_X$, and the $V_{IN}$ detection block are embodied in a single integrated circuit die.

4. A power converter including:
(a) a converter circuit configured to convert an input voltage $V_{IN}$ to a different output voltage $V_{OUT}$;
(b) a control block for disabling operation of the converter circuit;
(c) a voltage node $V_X$ between the converter circuit and the output $V_{OUT}$;

(d) a $V_{IN}$ detection block, coupled to the input voltage $V_{IN}$ and to the control block, and optionally coupled to one of $V_{OUT}$ or the voltage node $V_X$, and configured to detect a voltage drop in the input voltage $V_{IN}$ and generate a control signal to the control block to disable operation of the converter circuit, wherein the $V_{IN}$ detection block includes:
(1) a PMOS FET having a gate coupled to the voltage input $V_{IN}$, a source, and a drain;
(2) a resistor coupled between the voltage input $V_{IN}$ and the source of the PMOS FET;
(3) a capacitor coupled between the source of the PMOS FET and a reference voltage;
(4) an inverter coupled to the drain of the PMOS FET; and
(5) a threshold voltage adjustment circuit coupled to the drain of the PMOS FET;

wherein the PMOS FET causes the inverter to generate the control signal if a voltage applied to the gate of the PMOS FET from the voltage input $V_{IN}$ has a voltage drop relative to a voltage across the capacitor.

5. The power converter of claim 4, further including a degeneration resistor coupled between the capacitor and the source of the PMOS FET.

6. The power converter of claim 1, wherein the $V_{IN}$ detection block further includes:

(a) a scaling circuit coupled to the input voltage $V_{IN}$ and configured to output a scaled output voltage;
(b) a comparator circuit, having a first input coupled to the scaled output voltage and a second input coupled to one of $V_{OUT}$ or the voltage node $V_X$, and configured to output the control signal upon the occurrence of a voltage drop in the input voltage $V_{IN}$ relative to the voltage coupled to the second input.

7. A method for protecting a power converter, including:
(a) monitoring an input voltage $V_{IN}$ to a converter circuit of the power converter;
(b) applying a source of at least two non-overlapping clock signals having ON states separated by a dead time to the converter circuit; and
(c) disabling operation of the converter circuit upon detection of a voltage drop in the input voltage $V_{IN}$ during the dead time.

8. The method of claim 7, wherein the voltage drop of the input voltage $V_{IN}$ has a magnitude that induces damage to the power converter.

9. The method of claim 7, further including detecting a voltage drop in of the input voltage $V_{IN}$ relative to one of an output voltage $V_{OUT}$ of the power converter or a voltage node $V_X$ of the converter circuit.

\* \* \* \* \*